(12) United States Patent
Sasaki et al.

(10) Patent No.: US 7,227,720 B2
(45) Date of Patent: Jun. 5, 2007

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 523 days.

(21) Appl. No.: 10/871,014

(22) Filed: Jun. 21, 2004

(65) Prior Publication Data

US 2005/0280936 A1    Dec. 22, 2005

(51) Int. Cl.
    *G11B 5/147*    (2006.01)
(52) U.S. Cl. .................................................. 360/126
(58) Field of Classification Search ............... None
    See application file for complete search history.

(56) References Cited

U.S. PATENT DOCUMENTS

| 4,656,546 | A | 4/1987 | Mallory |
| 4,672,493 | A | 6/1987 | Schewe |
| 6,278,591 | B1 * | 8/2001 | Chang et al. ............. 360/317 |
| 6,504,675 | B1 | 1/2003 | Shukh et al. |

2003/0151850 A1    8/2003  Nakamura et al.

FOREIGN PATENT DOCUMENTS

| JP | 09161230 A | * | 6/1997 |
| JP | A 2003-203311 | | 7/2003 |
| JP | A 2003-242607 | | 8/2003 |

* cited by examiner

*Primary Examiner*—David Davis
(74) *Attorney, Agent, or Firm*—Oliff & Berridge, PLC

(57) ABSTRACT

A pole layer has an end that is located in a medium facing surface and that incorporates a first side closer to a gap layer and a second side opposite to the first side. A shield layer has an end that is located in the medium facing surface and that has an edge on a side of the gap layer. This edge includes: a first portion facing toward the first side, the gap layer being disposed in between; two second portions that are disposed on both sides of the first portion opposed to each other in the direction of the track width and that are disposed such that a difference in level is created between the first portion and each of the second portions; a third portion connecting an end of the first portion to one of the second portions; and a fourth portion connecting the other end of the first portion to the other one of the second portions. Each of the above-mentioned difference in level and the distance between the straight line drawn in line with the second side and the second portions is smaller than the distance between the straight line and the first portion.

14 Claims, 17 Drawing Sheets

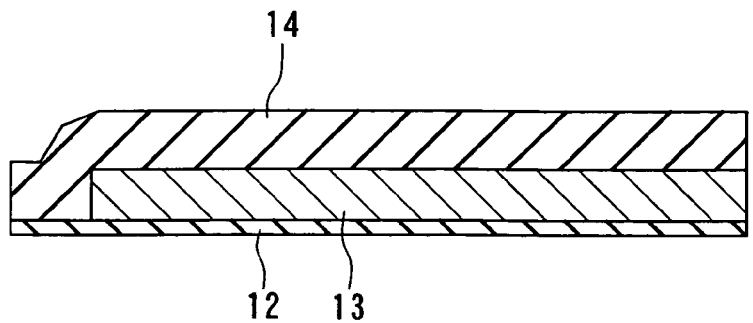
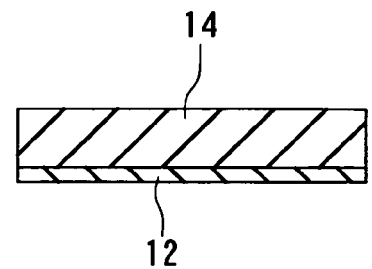
FIG. 4A          FIG. 4B
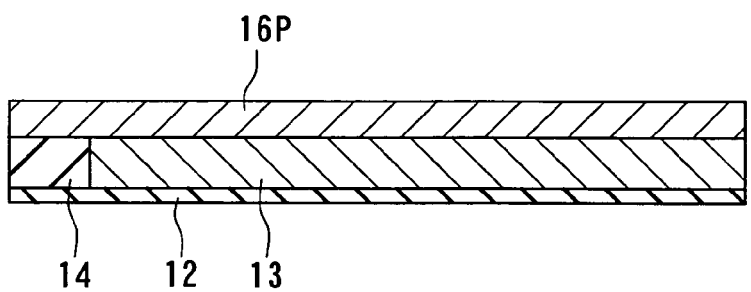
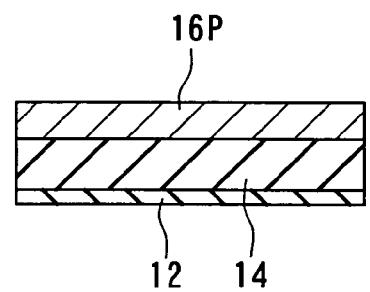
FIG. 5A          FIG. 5B
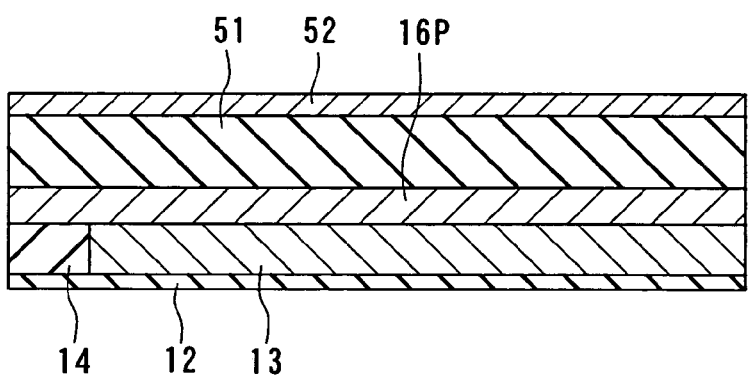
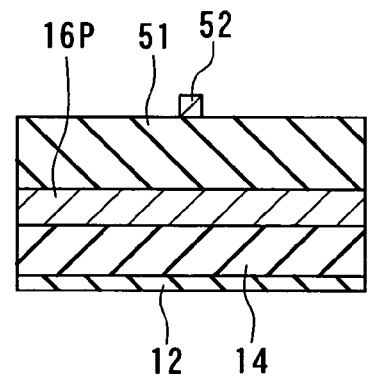
FIG. 6A          FIG. 6B

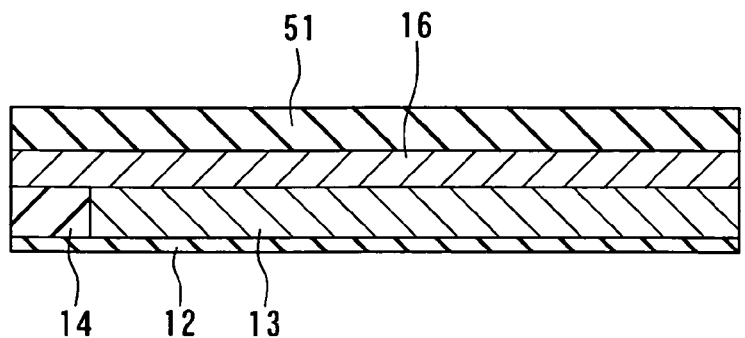 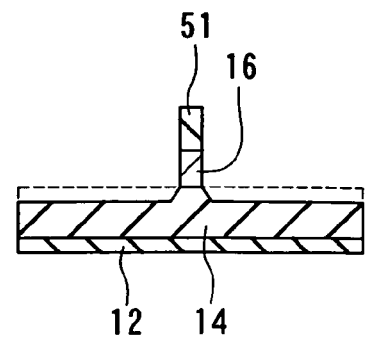
FIG. 7A    FIG. 7B
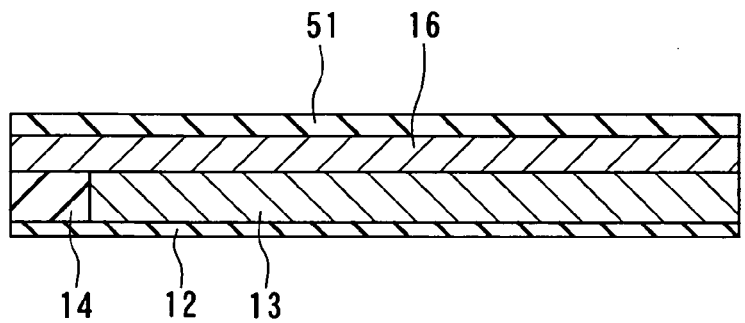 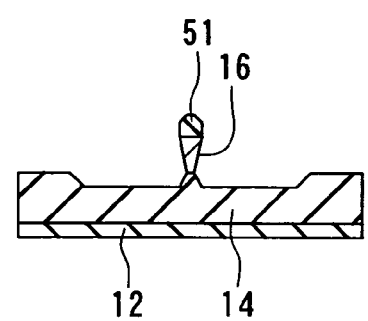
FIG. 8A    FIG. 8B
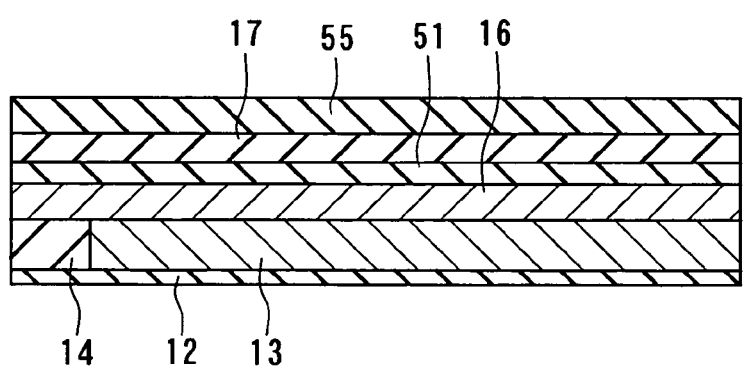 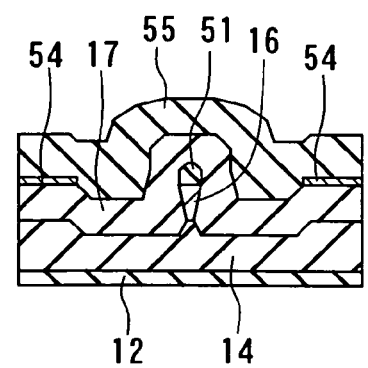
FIG. 9A    FIG. 9B

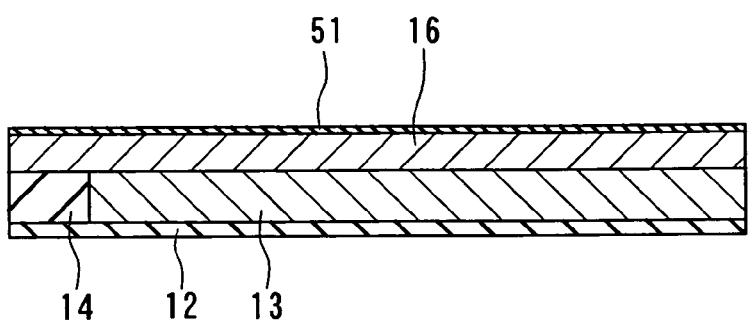 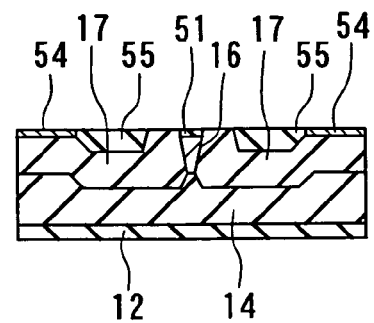
FIG. 10A FIG. 10B
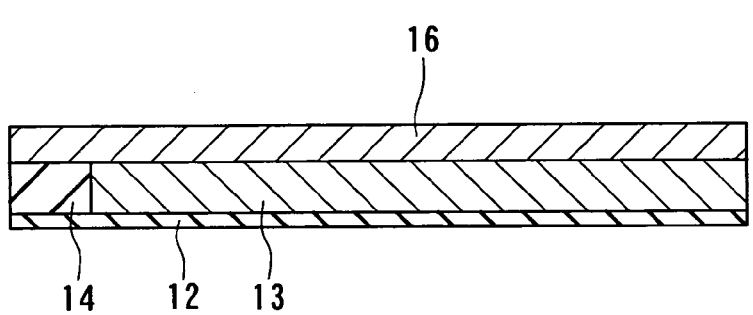 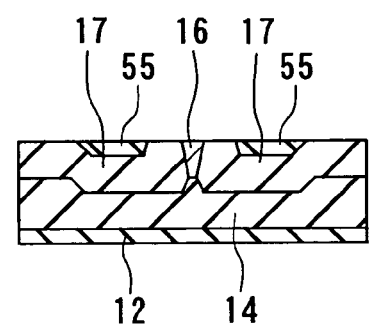
FIG. 11A FIG. 11B
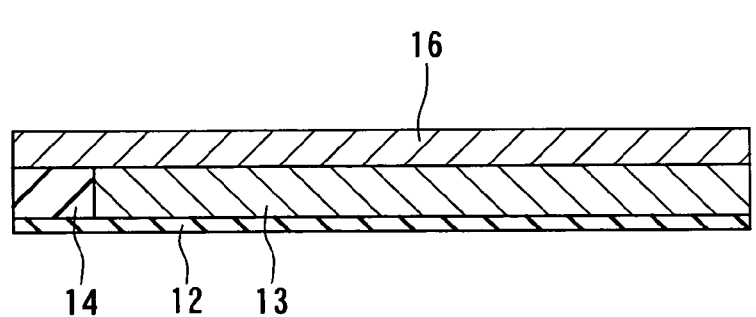 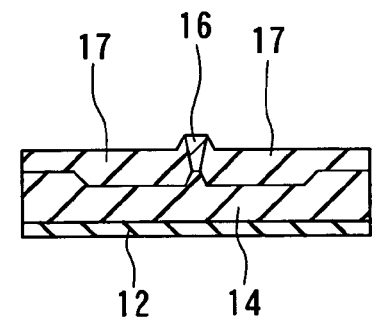
FIG. 12A FIG. 12B

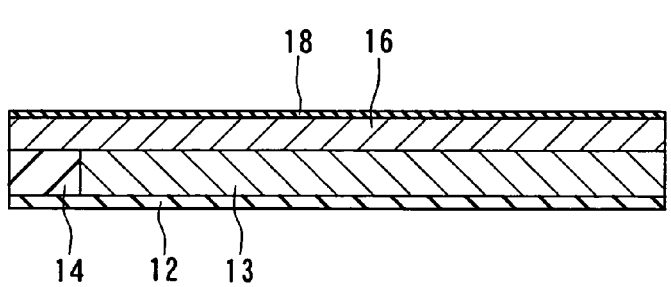 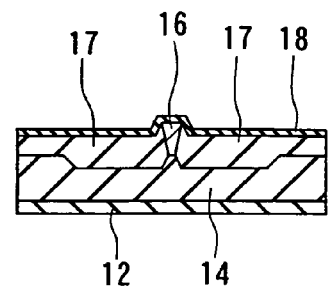
FIG. 13A  FIG. 13B
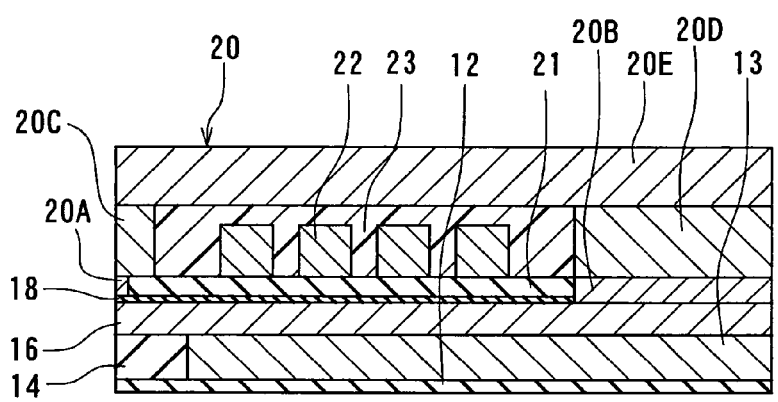 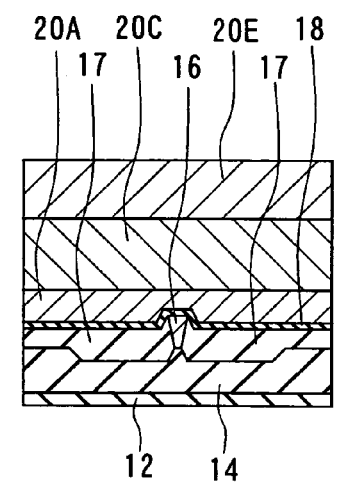
FIG. 14A  FIG. 14B

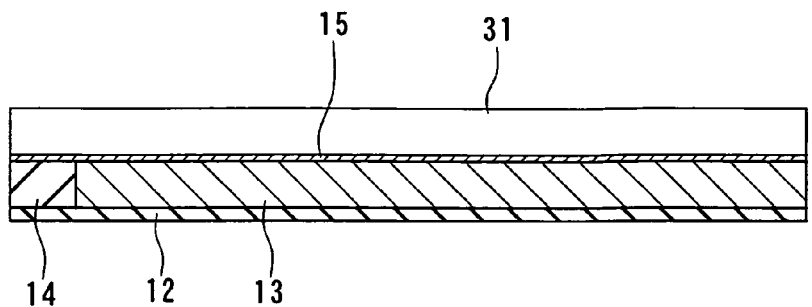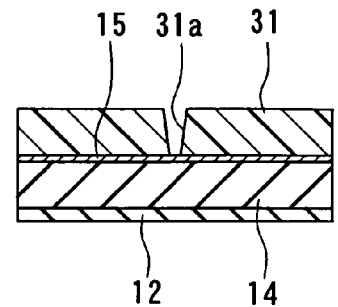
FIG. 21A  FIG. 21B
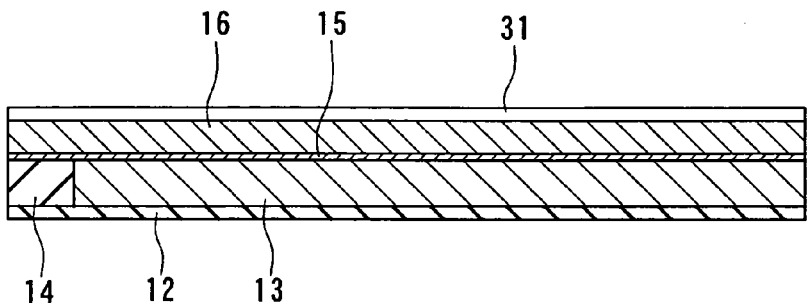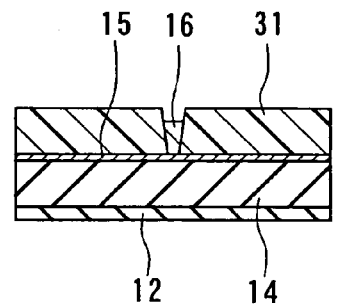
FIG. 22A  FIG. 22B
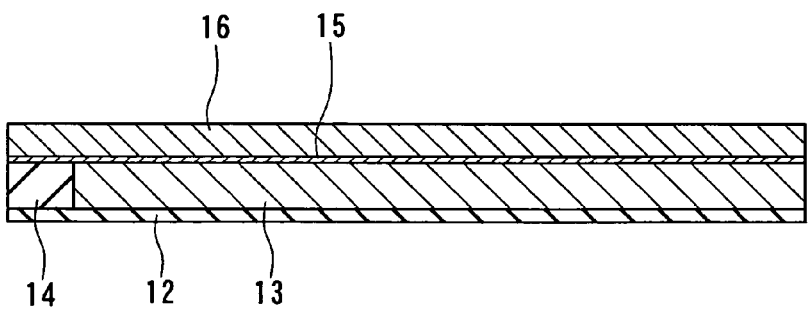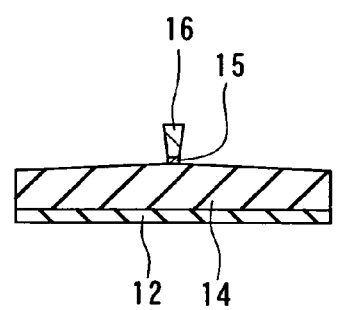
FIG. 23A  FIG. 23B

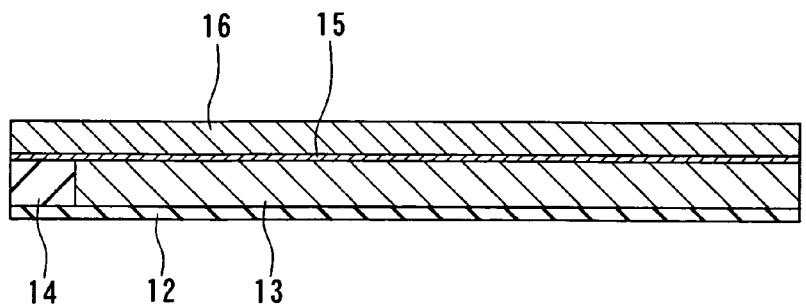 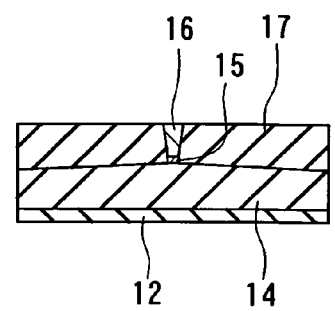
FIG. 24A  FIG. 24B
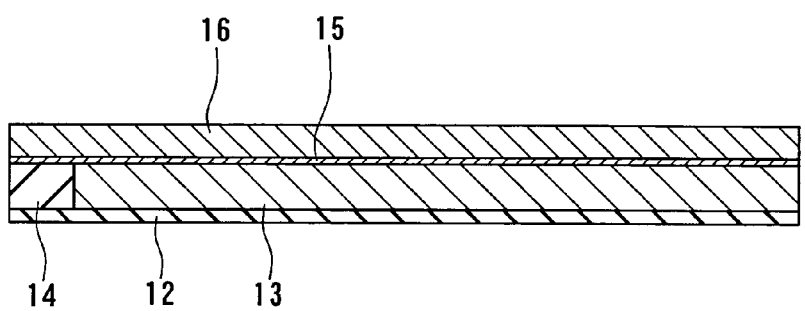 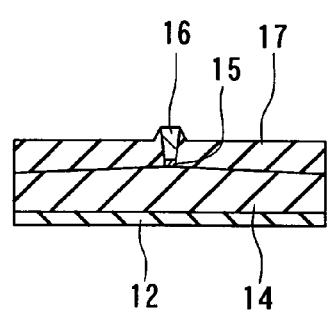
FIG. 25A  FIG. 25B
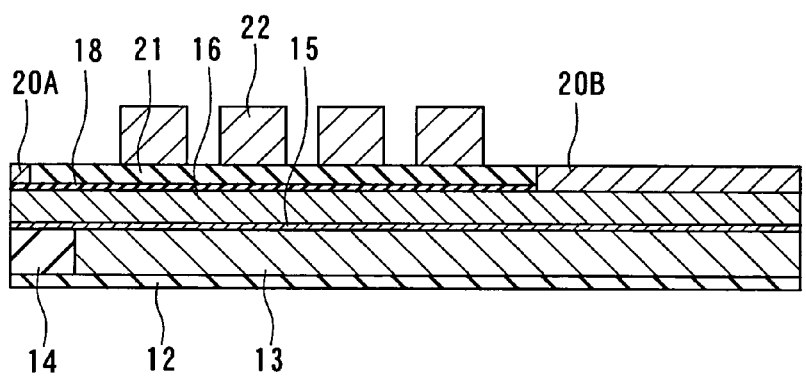 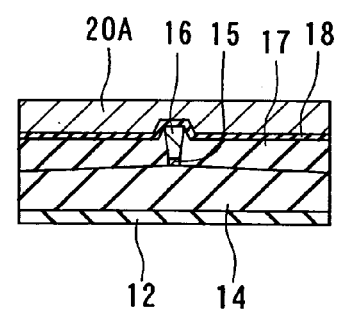
FIG. 26A  FIG. 26B

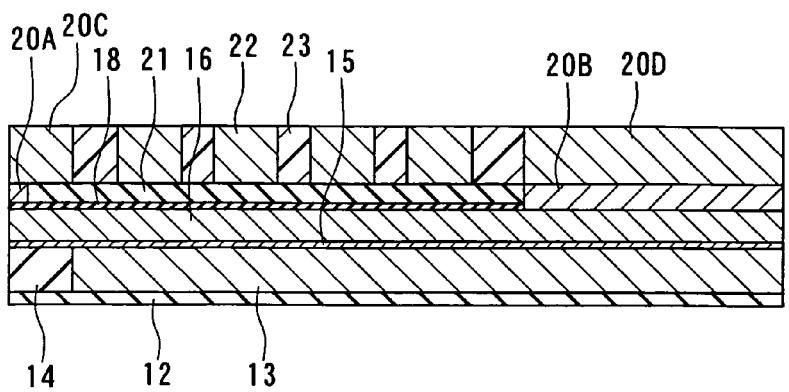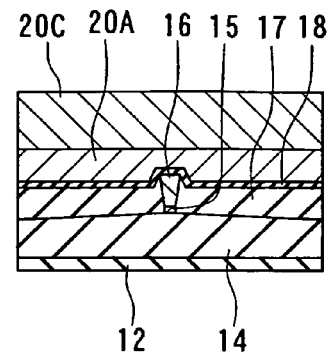
FIG. 27A  FIG. 27B
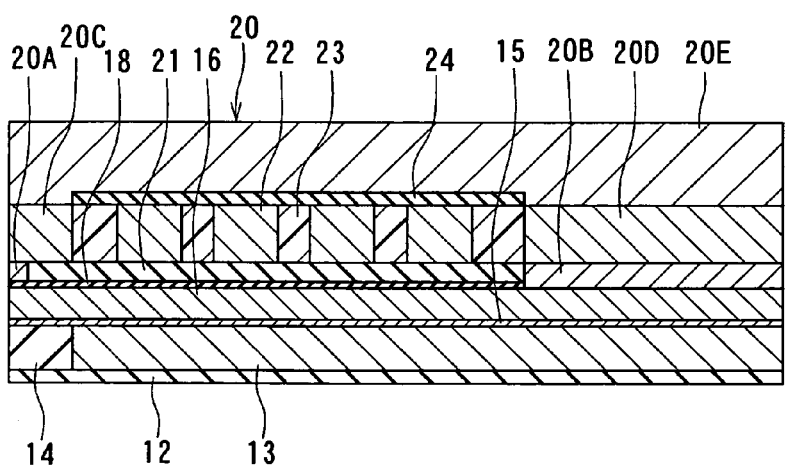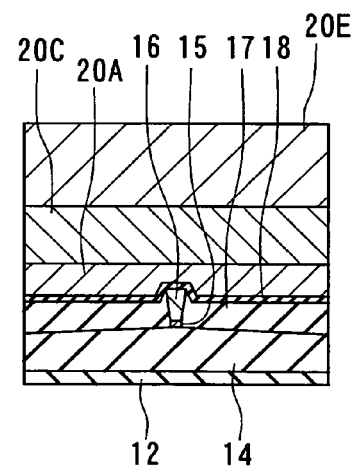
FIG. 28A  FIG. 28B

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared to the longitudinal magnetic recording system.

Magnetic heads for perpendicular magnetic recording typically used have a layered structure comprising a reproducing (read) head having a magnetoresistive element (that may be hereinafter called an MR element) for reading and a recording (write) head having an induction-type electromagnetic transducer for writing. The write head comprises magnetic poles that produce a magnetic field in the direction orthogonal to the surface of the recording medium.

For the perpendicular magnetic recording system it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced.

A magnetic head used for a magnetic disk drive such as a hard disk drive is typically provided in a slider. The slider has a medium facing surface that faces toward a recording medium. This medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed on adjacent two tracks. To achieve higher recording density, it is required to suppress adjacent track erasing. Unwanted writing on adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850 A1, the Published Unexamined Japanese Patent Application 2003-203311, and the U.S. Pat. No. 6,504,675 B1, for example. According to this technique, the end face of the pole located in the medium facing surface is made to have a shape of trapezoid in which the side located backward in the direction of travel of the recording medium (that is, the side located on the air-inflow-end side of the slider) is smaller than the other side.

As a magnetic head for perpendicular magnetic recording, a magnetic head comprising a magnetic pole and a shield is known, as disclosed in the U.S. Pat. No. 4,656,546, for example. In this magnetic head an end of the shield is located forward of an end of the pole along the direction of travel of the recording medium with a specific small space. Such a magnetic head will be hereinafter called a shield-type head. In the shield-type head the shield prevents a magnetic flux from reaching the recording medium, the flux being generated from the end of the pole and extending in directions except the direction orthogonal to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Reference is now made to FIG. 29 to describe a basic configuration of the shield-type head. FIG. 29 is a front view of a portion of the medium facing surface of an example of the shield-type head. The shield-type head comprises: a medium facing surface that faces toward a recording medium; a coil (not shown) for generating a field corresponding to data to be written on the medium; a pole layer 116 having an end located in the medium facing surface, allowing a magnetic flux corresponding to the field generated by the coil to pass and generating a write magnetic field for writing the data on the medium by means of the perpendicular magnetic recording system; a shield layer 120 having an end located in the medium facing surface and having a portion located away from the medium facing surface and coupled to the pole layer 116; and a gap layer 118 provided between the pole layer 116 and the shield layer 120. In this example the pole layer 116 is disposed on an insulating layer 114. An insulating layer 117 is provided around the pole layer 116. The pole layer 116 and the insulating layer 117 have flattened top surfaces on which the gap layer 118 is disposed. The shield layer 120 is further disposed on the gap layer 118.

The end of the pole layer 116 located in the medium facing surface has a shape of trapezoid in which the side closer to the gap layer 118 is longer than the other side.

Problems of the shield-type heads such as the one shown in FIG. 29 will now be described. In FIG. 29 the physical track width PTW is determined by the width of a portion of the end of the pole layer 116 located in the medium facing surface, the portion being in contact with the gap layer 118. However, a magnetic flux 121 starting from the pole layer 116 over the gap layer 118 and reaching the shield layer 120 extends wider than the physical track width PTW. Consequently, the effective track width ETW is greater than the physical track width PTW. For example, if the physical track width PTW is 0.12 micrometer ($\mu$m), the thickness of the pole layer 116 is 0.3 $\mu$m, and the thickness of the gap layer 118 is 50 nanometers (nm), the effective track width ETW is greater than the physical track width PTW by no less than 0.08 to 0.12 $\mu$m, according to conventional devices.

If the effective track width ETW is much greater than the physical track width PTW as described above, problems arises, such as adjacent track erasing and unwanted writing performed on adjacent two tracks. If the physical track width PTW is reduced to reduce the effective track width ETW, it is difficult to control the physical track width PTW and the overwrite property is reduced.

OBJECT AND SUMMARY OF THE INVENTION

It is an object of the invention to provide a magnetic head for perpendicular magnetic recording having a structure in which a pole layer faces toward a shield layer with a gap layer disposed in between, the head being capable of reducing the difference between the physical track width and the effective track width, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end located in the medium facing surface, allowing a magnetic flux corresponding to the field generated by the coil to pass therethrough, and generating a write magnetic field for writing the data on the recording medium through the use of a perpendicular magnetic recording system; a shield layer having an end located in the medium facing surface, a portion of the shield layer located away from the medium facing surface being coupled to the pole layer; and a gap layer made of a nonmagnetic material and provided between the pole layer and the shield layer. In the medium facing surface, the end of the shield layer is disposed forward of the end of the pole layer along a direction of travel of the recording medium with a specific space created by the thickness of the gap layer. At least part of the coil is disposed between the pole layer and the shield layer and insulated from the pole layer and the shield layer.

According to the magnetic head of the invention, the end of the pole layer located in the medium facing surface incorporates: a first side closer to the gap layer; a second side opposite to the first side; a third side connecting an end of the first side to an end of the second side; and a fourth side connecting the other end of the first side to the other end of the second side. The end of the shield layer located in the medium facing surface has an edge on a side of the gap layer. This edge includes: a first portion facing toward the first side, the gap layer being disposed in between; two second portions that are disposed on both sides of the first portion opposed to each other in the direction of the track width and that are disposed such that a difference in level is created between the first portion and each of the second portions; a third portion connecting an end of the first portion to one of the second portions; and a fourth portion connecting the other end of the first portion to the other one of the second portions. Each of the difference in level and the distance between a straight line drawn in line with the second side and the second portions is smaller than the distance between the straight line and the first portion.

According to the magnetic head of the invention, the magnetic flux starting from the pole layer over the gap layer and reaching the shield layer is more suppressed from extending in the direction of the track width, compared with a case in which the end of the shield layer located in the medium facing surface has a flat edge on a side of the gap layer.

The method of manufacturing the magnetic head of the invention comprises the steps of forming the pole layer; forming the gap layer on the pole layer; forming the shield layer on the gap layer; and forming the coil.

According to the method of the invention, the end of the pole layer located in the medium facing surface is made to incorporate: a first side closer to the gap layer; a second side opposite to the first side; a third side connecting an end of the first side to an end of the second side; and a fourth side connecting the other end of the first side to the other end of the second side. In the step of forming the shield layer, the end of the shield layer located in the medium facing surface is made to have an edge on a side of the gap layer, the edge including: a first portion facing toward the first side, the gap layer being disposed in between; two second portions that are disposed on both sides of the first portion opposed to each other in the direction of the track width and that are disposed such that a difference in level is created between the first portion and each of the second portions; a third portion connecting an end of the first portion to one of the second portions; and a fourth portion connecting the other end of the first portion to the other one of the second portions. Each of the difference in level and the distance between a straight line drawn in line with the second side and the second portions is smaller than the distance between the straight line and the first portion.

According to the magnetic head or the method of manufacturing the same of the invention, the difference in level may be equal to or greater than the thickness of the gap layer between the first side and the first portion.

According to the magnetic head or the method of manufacturing the same of the invention, each of the distance between the third portion and the pole layer and the distance between the fourth portion and the pole layer may be smaller than the thickness of the gap layer between the first side and the first portion.

According to the magnetic head or the method of manufacturing the same of the invention, the gap layer may include a portion disposed between the first side and the first portion, a portion touching the third portion, and a portion touching the fourth portion, and each of the portion touching the third portion and the portion touching the fourth portion may have a thickness smaller than that of the portion disposed between the first side and the first portion.

According to the magnetic head or the method of manufacturing the same of the invention, a nonmagnetic layer that is made of a nonmagnetic material and touches the third side and the fourth side may be provided. The nonmagnetic layer may have two protrusions disposed between the third side and the third portion and between the fourth side and the fourth portion, respectively. Each of the protrusions may have a width that is taken along the track width and that decreases as a distance from the first side decreases.

According to the magnetic head or the method of manufacturing the same of the invention, the end of the pole layer located in the medium facing surface may have a shape of trapezoid in which the first side is longer than the second side.

According to the magnetic head or the method of manufacturing the same of the invention, the end of the shield layer located in the medium facing surface has the edge on a side of the gap layer, the edge including: the first portion facing toward the first side, the gap layer being disposed in between; the two second portions that are disposed on both sides of the first portion opposed to each other in the direction of the track width and that are disposed such that a difference in level is created between the first portion and each of the second portions; the third portion connecting an end of the first portion to one of the second portions; and the fourth portion connecting the other end of the first portion to the other one of the second portions. Each of the difference in level and the distance between the straight line drawn in line with the second side and the second portions is smaller than the distance between the straight line and the first portion. As a result, according to the invention, the magnetic flux starting from the pole layer over the gap layer and reaching the shield layer is more suppressed from extending in the direction of the track width, compared with a case in which the end of the shield layer located in the medium facing surface has a flat edge on a side of the gap layer. It is thereby possible to reduce the difference between the physical track width and the effective track width.

Other and further objects, features and advantages of the invention will appear more fully from the following description.

BRIEF DESCRIPTION OF THE DRAWINGS

FIG. 4A and FIG. 4B are views for illustrating a step of a method of manufacturing the magnetic head of the first embodiment of the invention.

FIG. 5A and FIG. 5B are views for illustrating a step that follows the step shown in FIG. 4A and FIG. 4B.

FIG. 6A and FIG. 6B are views for illustrating a step that follows the step shown in FIG. 6A and FIG. 5B.

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

FIG. 9A and FIG. 9B are views for illustrating a step that follows the step shown in FIG. 8A and FIG. 8B.

FIG. 10A and FIG. 10B are views for illustrating a step that follows the step shown in FIG. 9A and FIG. 9B.

FIG. 11A and FIG. 11B are views for illustrating a step that follows the step shown in FIG. 10A and FIG. 10B.

FIG. 12A and FIG. 12B are views for illustrating a step that follows the step shown in FIG. 11A and FIG. 11B.

FIG. 13A and FIG. 13B are views for illustrating a step that follows the step shown in FIG. 12A and FIG. 12B.

FIG. 14A and FIG. 14B are views for illustrating a step that follows the step shown in FIG. 13A and FIG. 13B.

FIG. 21A and FIG. 21B are views for illustrating a step of a method of manufacturing the magnetic head of the second embodiment of the invention.

FIG. 22A and FIG. 22B are views for illustrating a step that follows the step shown in FIG. 21A and FIG. 21B.

FIG. 23A and FIG. 23B are views for illustrating a step that follows the step shown in FIG. 22A and FIG. 22B.

FIG. 24A and FIG. 24B are views for illustrating a step that follows the step shown in FIG. 23A and FIG. 23B.

FIG. 25A and FIG. 25B are views for illustrating a step that follows the step shown in FIG. 24A and FIG. 24B.

FIG. 26A and FIG. 26B are views for illustrating a step that follows the step shown in FIG. 25A and FIG. 25B.

FIG. 27A and FIG. 27B are views for illustrating a step that follows the step shown in FIG. 26A and FIG. 26B.

FIG. 28A and FIG. 28B are views for illustrating a step that follows the step shown in FIG. 27A and FIG. 27B.

DETAILED DESCRIPTION OF THE PREFERRED EMBODIMENTS

[First Embodiment]

Figure 1:
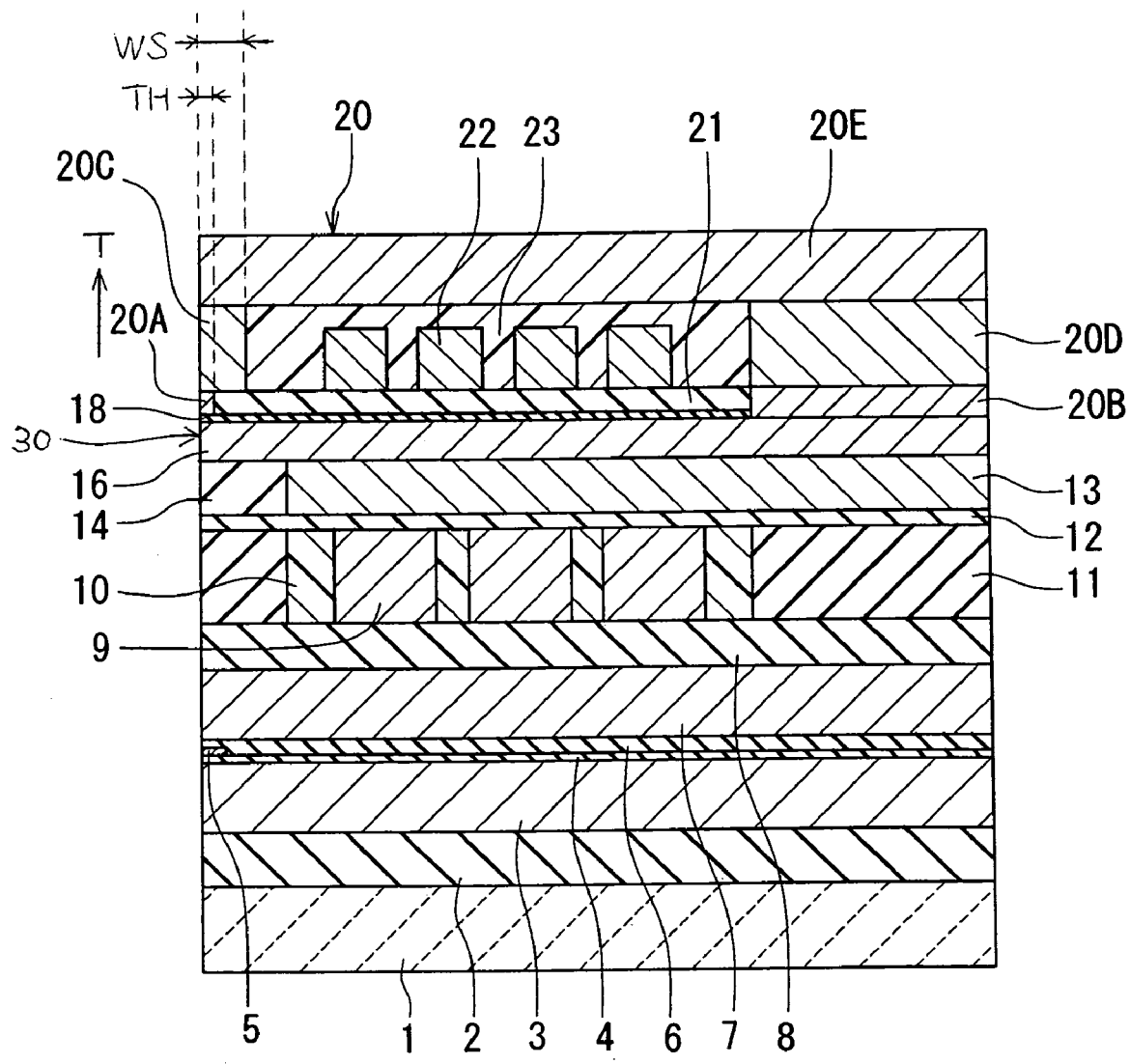
FIG. 1 is a cross-sectional view for illustrating the configuration of a magnetic head of a first embodiment of the invention.
Figure 2:
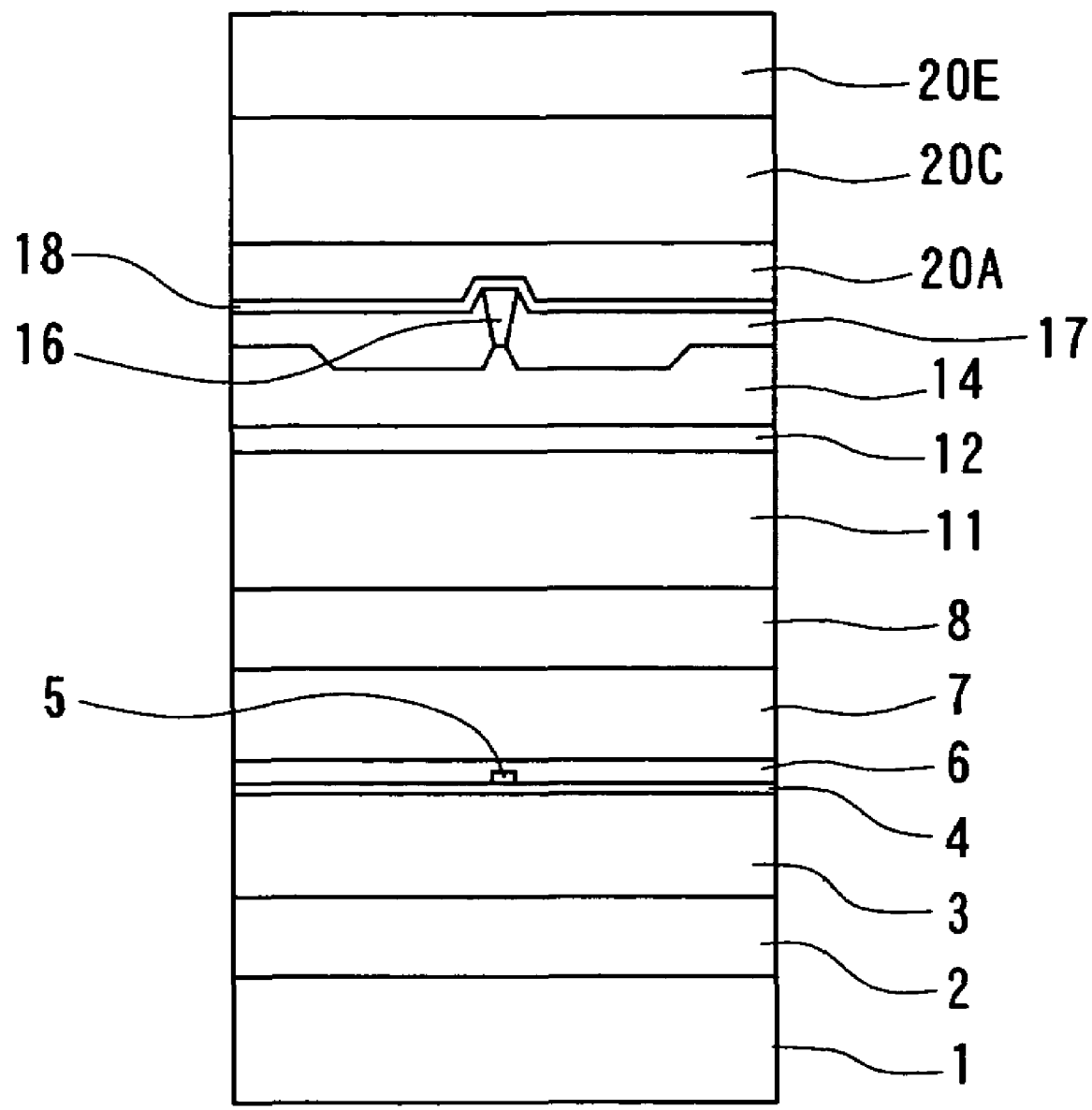
FIG. 2 is a front view of the medium facing surface of the magnetic head of FIG. 1.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a cross-sectional view for illustrating the configuration of the magnetic head of the embodiment. FIG. 1 illustrates a cross section orthogonal to the medium facing surface and a surface of a substrate. The arrow indicated with T in FIG. 1 shows the direction of travel of a recording medium. FIG. 2 is a front view of the medium facing surface of the magnetic head of the embodiment.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 makes up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises: an insulating layer 12 made of an insulating material and disposed on the flattened top surfaces of the coil 9 and the insulating layers 10 and 11; a yoke layer 13 made of a magnetic material and disposed on the insulating layer 12; and an insulating layer 14 made of an insulating material and disposed around the yoke layer 13. The insulating layers 12 and 14 are made of alumina, for example. The yoke layer 13 is made of CoNiFe, for example.

The magnetic head further comprises: a pole layer 16 made of a magnetic material and disposed on the top surfaces of the yoke layer 13 and the insulating layer 14; and a nonmagnetic layer 17 made of a nonmagnetic material and disposed around the pole layer 16. The pole layer 16 may be made of a magnetic material containing Co and Fe, for example. To be specific, the pole layer 16 may be made of a material such as CoFeN having a saturation flux density of 2.4 T, CoFe having a saturation flux density of 2.4 T, or CoFeNi having a saturation flux density of 2.3 T. The nonmagnetic layer 17 may be made of alumina, for example.

The magnetic head further comprises a gap layer 18 disposed on the top surfaces of the pole layer 16 and the nonmagnetic layer 17. The gap layer 18 has an opening located at a distance from the medium facing surface 30. The gap layer 18 may be made of an insulating material such as alumina or a nonmagnetic metal material such as Ru, NiCu, Ta, W or NiB.

The magnetic head further comprises a shield layer 20. The shield layer 20 has: a first layer 20A disposed on the gap layer 18; a second layer 20C disposed on the first layer 20A; a coupling layer 20B disposed on a portion of the pole layer 16 where the opening of the gap layer 18 is formed; a coupling layer 20D disposed on the coupling layer 20B; and a third layer 20E disposed to couple the second layer 20C to the coupling layer 20D. The first layer 20A, the second layer 20C, the coupling layers 20B and 20D, and the third layer 20E are made of CoNiFe, for example.

The magnetic head further comprises a nonmagnetic layer 21 made of a nonmagnetic material and disposed around the coupling layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W. Cr, Ru, Cu or Ni.

The magnetic head further comprises: a coil 22 disposed on the nonmagnetic layer 21; and an insulating layer 23 covering the coil 22. The coil 22 is flat-whorl-shaped. Part of the coil 22 passes between the second layer 20C and the coupling layer 20D. The coil 22 is made of a conductive material such as copper. The second layer 20C, the coupling layer 20D and the insulating layer 23 have flattened top surfaces. The insulating layer 23 is made of photoresist, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the yoke layer 13, the pole layer 16, the nonmagnetic layer 17, the gap layer 18, the shield layer 20, the nonmagnetic layer 21, the coil 22, and the insulating layer 23. The coils 9 and 22 generate a magnetic field corresponding to data to be written on the recording medium. The coil 9 is not a component requisite for the write head and may be omitted.

The pole layer 16 has an end located in the medium facing surface 30 and allows the magnetic flux corresponding to the field generated by the coil 22 to pass therethrough and generates a write magnetic field for writing the data on the medium by using the perpendicular magnetic recording system.

The shield layer 20 has an end located in the medium facing surface 30 and has a portion away from the medium facing surface 30 that is coupled to the pole layer 16. The gap layer 18 is made of a nonmagnetic material and provided between the pole layer 16 and the shield layer 20.

In the medium facing surface 30, the end of the shield layer 20 is disposed forward of the end of the pole layer 16 along the direction T of travel of the recording medium with a specific space created by the thickness of the gap layer 18. At least part of the coil 22 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18; the coupling layers 20B and the 20D disposed on the portion of the pole layer 16 where the opening of the gap layer 18 is formed; and the third layer 20E disposed to couple the second layer 20C to the coupling layer 20D. The second layer 20C is disposed between the medium facing surface 30 and the at least part of the coil 22.

The insulating layer 23 is disposed to cover the coil 22. Each of the second layer 20C, the coupling layer 20D, and the insulating layer 23 has a flattened surface that is located farther from the pole layer 16 than the other surface.

Figure 3:
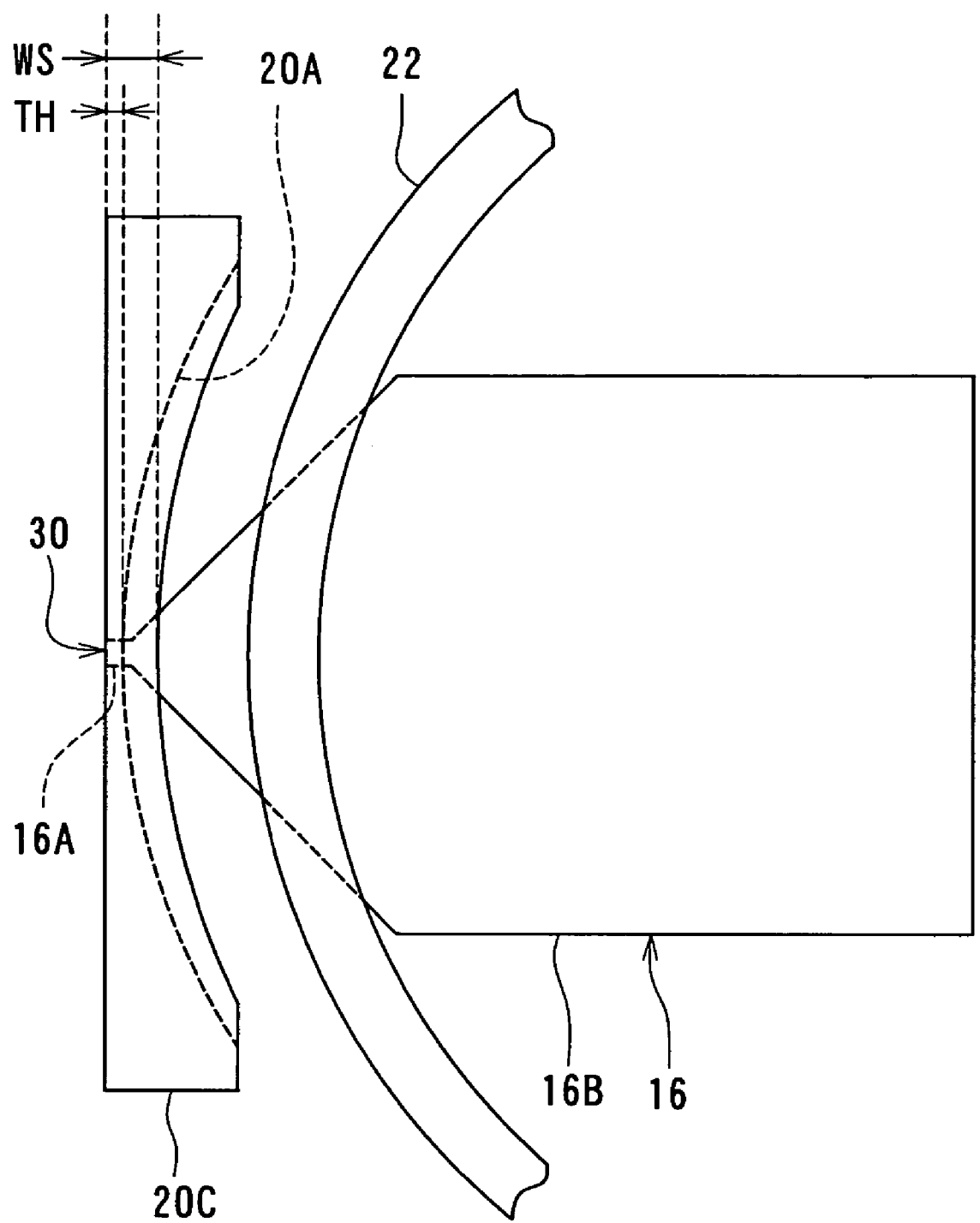
FIG. 3 is a top view of the main part of the magnetic head of FIG. 1.

FIG. 3 is a top view illustrating the pole layer 16, the first layer 20A, the second layer 20C and part of the coil 22. As shown in FIG. 3, the pole layer 16 incorporates a track width defining portion 16A and a wide portion 16B. The track width defining portion 16A has an end located in the medium facing surface 30 and has a uniform width equal to the track width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B.

As shown in FIG. 2, the end of the pole layer 16 located in the medium facing surface 30 has a shape of trapezoid in which the side closer to the gap layer 18 is longer than the other side. In the medium facing surface 30 the width of the portion of the pole layer 16 touching the gap layer 18 is the physical track width. The physical track width is 0.12 µm, for example. The pole layer 16 has a thickness that falls within a range of 0.3 to 0.35 µm inclusive, for example. In the neighborhood of the medium facing surface 30, both sides of the pole layer 16 opposed to each other in the direction of the track width form an angle that falls within a range of 5 to 12 degrees inclusive, for example, with respect to the direction orthogonal to the top surface of the substrate 1. The gap layer 18 has a thickness that falls within a range of 40 to 80 nm inclusive, for example.

The first layer 20A of the shield layer 20 has a first end located in the medium facing surface 30 and a second end opposite to the first end. The second layer 20C of the shield layer 20 also has a first end located in the medium facing surface 30 and a second end opposite to the first end. As shown in FIG. 3, the outermost end of the coil 22 has a shape of circular arc protruding toward the medium facing surface 30. Each of the second end of the first layer 20A and the second end of the second layer 20C has a shape of circular arc along the outermost end of the coil 22.

The second end of the first layer 20A defines the throat height TH. That is, as shown in FIG. 1 and FIG. 3, the throat height TH is the minimum distance between the first end and the second end of the portion of the first layer 20A facing toward the pole layer 16 with the gap layer 18 disposed in between. The throat height TH falls within a range of 0.1 to 0.3 µm inclusive, for example. The minimum distance WS between the first end and the second end of the portion of the second layer 20C facing toward the pole layer 16 with the gap layer 18 and the first layer 20A disposed in between falls within a range of 0.5 to 0.8 µm inclusive, for example. The first layer 20A and the coupling layer 20B have a thickness that falls within a range of 0.3 to 0.5 µm inclusive, for example. The second layer 20C and the coupling layer 20D have a thickness that falls within a range of 3.0 to 3.5 µm inclusive, for example. The third layer 20E has a thickness that falls within a range of 1.5 to 2.5 µm inclusive, for example.

As shown in FIG. 1, the nonmagnetic layer 21 is disposed on a side of the first layer 20A. The nonmagnetic layer 21 has a thickness that is equal to or greater than the thickness of the first layer 20A and that falls within a range of 0.3 to 0.5 µm inclusive, for example. At least part of the coil 22 is disposed on the nonmagnetic layer 21. The coil 22 has a thickness that is equal to or smaller than the thickness of the second layer 20C and that falls within a range of 2.5 to 3.5 µm inclusive, for example. The at least part of the coil 22 is disposed on a side of the nonmagnetic layer 21 opposite to the pole layer 16 and in a region farther from the pole layer 16 than a surface (the top surface) of the first layer 20A opposite to the pole layer 16.

The geometries and positional relationship of the pole layer 16, the nonmagnetic layer 17, the gap layer 18 and the shield layer 20 in the medium facing surface 30 will be described in detail later.

Reference is now made to FIG. 4A to FIG. 14A and FIG. 4B to FIG. 14B to describe a method of manufacturing the magnetic head of the embodiment. FIG. 4A to FIG. 14A are cross sections of layered structures obtained through the manufacturing process of the magnetic head, the cross sections being orthogonal to the medium facing surface and the substrate. FIG. 4B to FIG. 14B are cross sections of portions of the layered structures near the medium facing surface that are parallel to the medium facing surface. Portions closer to the substrate 1 than the insulating layer 12 are omitted in FIG. 4A to FIG. 14A and FIG. 4B to FIG. 14B.

According to the method of manufacturing the magnetic head of the embodiment, as shown in FIG. 1, the insulating layer 2, the bottom shield layer 3 and the bottom shield gap film 4 are formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by chemical mechanical polishing (CMP), for example. Next, the insulating layer 12 is formed on the flattened top surfaces of the coil 9 and the insulating layers 10 and 11.

FIG. 4A and FIG. 4B illustrate the following step. In the step, first, the yoke layer 13 having a thickness of 1.5 µm, for example, is formed by frame plating, for example, on the insulating layer 12. Next, the insulating layer 14 made of alumina, for example, and having a thickness of 2 µm, for example, is formed on the entire top surface of the layered structure obtained through the foregoing steps.

FIG. 5A and FIG. 5B illustrate the following step. In the step, first, the insulating layer 14 is polished by CMP, for example, so that the yoke layer 13 is exposed, and the top surfaces of the yoke layer 13 and the insulating layer 14 are thereby flattened. Next, a magnetic layer 16P to be the pole layer 16 is formed. The magnetic layer 16P may be made of a material such as CoFeN and formed by sputtering, or may be made of a material such as CoFe or CoFeNi and formed by plating.

FIG. 6A and FIG. 6B illustrate the following step. In the step, first, an alumina layer 51 having a thickness of 1.2 µm, for example, is formed on the magnetic layer 16P. Next, a mask 52 made of NiFe, for example, and having a thickness of 0.8 µm, for example, is formed on the alumina layer 51 by frame plating. The plane geometry of the mask 52 corresponds to that of the pole layer 16.

FIG. 7A and FIG. 7B illustrate the following step. In the step, first, the alumina layer 51 is selectively etched, using the mask 52. Furthermore, using the alumina layer 51 remaining after this etching as a mask, the magnetic layer 16P is selectively etched. The magnetic layer 16P remaining after this etching is the pole layer 16. The etching of each of the alumina layer 51 and the magnetic layer 16P is performed by reactive ion etching, for example. In this case, it is preferred to use an etching gas containing a halogen gas and an additive gas such as $O_2$, $CO_2$, $N_2$ or $H_2$. The halogen gas may be $Cl_2$ or a gas containing $Cl_2$ and $BCl_3$. The etching is preferably performed at a temperature that falls within a range of 120 to 250° C. inclusive.

FIG. 7B illustrates a case in which a portion of the insulating layer 14 is etched, too, by the etching of the magnetic layer 16P. However, it is alternatively possible that the etching of the magnetic layer 16P is stopped at the interface between the magnetic layer 16P and the insulating layer 14, so that the insulating layer 14 is not etched. For the sake of the step that follows, it is preferred to etch a portion of the insulating layer 14, too. To etch the portion of the insulating layer 14, it is preferred that the etching gas includes $BCl_3$ in addition to $Cl_2$.

FIG. 8A and FIG. 8B illustrate the following step. In the step, both sides of the pole layer 16 opposed to each other in the direction of the track width are etched by ion milling, for example, so that each of these sides forms an angle that falls within a range of 5 to 12 degrees inclusive with respect to the direction orthogonal to the top surface of the substrate 1. This etching may be performed only for a period within a range of 2 to 8 minutes inclusive wherein the direction of movement of ion beams forms an angle of 45 to 75 degrees with respect to the direction orthogonal to the top surface of the substrate 1, and the ion beams are swept within a range of 85 to 150 degrees in the horizontal direction. For performing this step, it is preferred that a portion of the insulating layer 14 is etched, as shown in FIG. 7B, since ion beams will thereby easily reach the neighborhood of the bottom of the pole layer 16.

FIG. 9A and FIG. 9B illustrate the following step. In the step, first, the nonmagnetic layer 17 having a thickness equal to the thickness of the pole layer 16 is formed on the entire top surface of the layered structure. Next, a stopper film 54 having a thickness of 10 to 20 nm, for example, is formed on the nonmagnetic layer 17 except a region near the pole layer 16. The stopper film 54 may be made of a nonmagnetic refractory metal such as Ta, Ru or W. Next, an insulating film 55 made of alumina, for example, and having a thickness of 0.5 to 0.8 μm, for example, is formed on the entire top surface of the layered structure.

Next, as shown in FIG. 10A and FIG. 10B, the insulating film 55 is polished by CMP, for example. This polishing is stopped when the stopper film 54 is exposed.

FIG. 11A and FIG. 11B illustrate the following step. In the step, first, the stopper film 54 is removed by reactive ion etching or wet etching, for example. The top surface of the nonmagnetic layer 17 is thereby exposed. Next, the top surfaces of the nonmagnetic layer 17 and the insulating layer 55 are slightly polished by CMP, for example, to expose the top surface of the pole layer 16 and to flatten the top surfaces of the pole layer 16, the nonmagnetic layer 17 and the insulating layer 55. The thickness of the pole layer 16 is thereby controlled to be of a desired value.

Next, as shown in FIG. 12A and FIG. 12B, a portion of the nonmagnetic layer 17 and the insulating layer 55 are etched. At this time, the insulating layer 55 is completely removed. Through this etching, the top surface of the nonmagnetic layer 17 is made to be located lower than the top surface of the pole layer 16, and a difference in level is created between the top surface of the pole layer 16 and the top surface of the nonmagnetic layer 17. The nonmagnetic layer 17 and the insulating layer 55 may be etched by reactive ion etching, for example. In this case, it is preferred to use an etching gas containing a halogen gas and an additive gas such as $O_2$, $CO_2$, $N_2$, $H_2$, He, Ar or $CF_4$. The halogen gas may be $BCl_3$ or a gas containing $Cl_2$ and $BCl_3$. The etching is preferably performed at a temperature that falls within a range of 50 to 250° C. inclusive.

Next, as shown in FIG. 13A and FIG. 13B, the gap layer 18 is formed on the entire top surface of the layered structure.

FIG. 14A and FIG. 14B illustrate the following step. In the step, first, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. The first layer 20A and the coupling layer 20B may be formed by frame plating or by making a magnetic layer through sputtering and selectively etching the magnetic layer. Selective etching of the magnetic layer may be performed by, for example, making an alumina layer on the magnetic layer, making a mask on the alumina layer by frame plating, and etching the alumina layer and the magnetic layer using the mask.

Next, the nonmagnetic layer 21 is formed on the entire top surface of the layered structure. Next, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened. Next, the coil 22 is formed by frame plating, for example, such that at least part of the coil 22 is disposed on the nonmagnetic layer 21. Next, the second layer 20C and the coupling layer 20D are formed by frame plating, for example. Alternatively, the coil 22 may be formed after the second layer 20C and the coupling layer 20D are formed. Next, the insulating layer 23 made of photoresist, for example, is selectively formed to cover the coil 22. Next, although not shown, an insulating film made of alumina, for example, and having a thickness of 3 to 5 μm, for example, is formed on the entire top surface of the layered structure. Next, the insulating film is polished by CMP, for example, so that the second layer 20C and the coupling layer 20D are exposed, and the top surfaces of the second layer 20C, the coupling layer 20D and the insulating layer 23 are thereby flattened. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment win now be described. The magnetic head writes data on a recording medium by using the write head and reads data written on the recording medium by using the read head. In the write head the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic filed applied from outside the magnetic head to the magnetic head. It is thereby possible to prevent erroneous writing on the recording medium caused by the disturbance magnetic filed intensively taken in the pole layer 16.

According to the embodiment, in the medium facing surface 30, the end of the shield layer 20 is disposed forward of the end of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 2, the end of the pole layer 16 located in the medium facing surface 30 has a shape of trapezoid in which the side closer to the gap layer 18 is longer than the other side. It is thereby possible to prevent the problems resulting from the skew.

Reference is now made to FIG. 15 to FIG. 18 to describe the details of the geometries and positional relationship of the pole layer 16, the nonmagnetic layer 17, the gap layer 18 and the shield layer 20 in the medium facing surface 30. FIG. 15 to FIG. 18 each illustrate a portion of the medium facing surface 30 for describing features of the embodiment.

Figure 15:
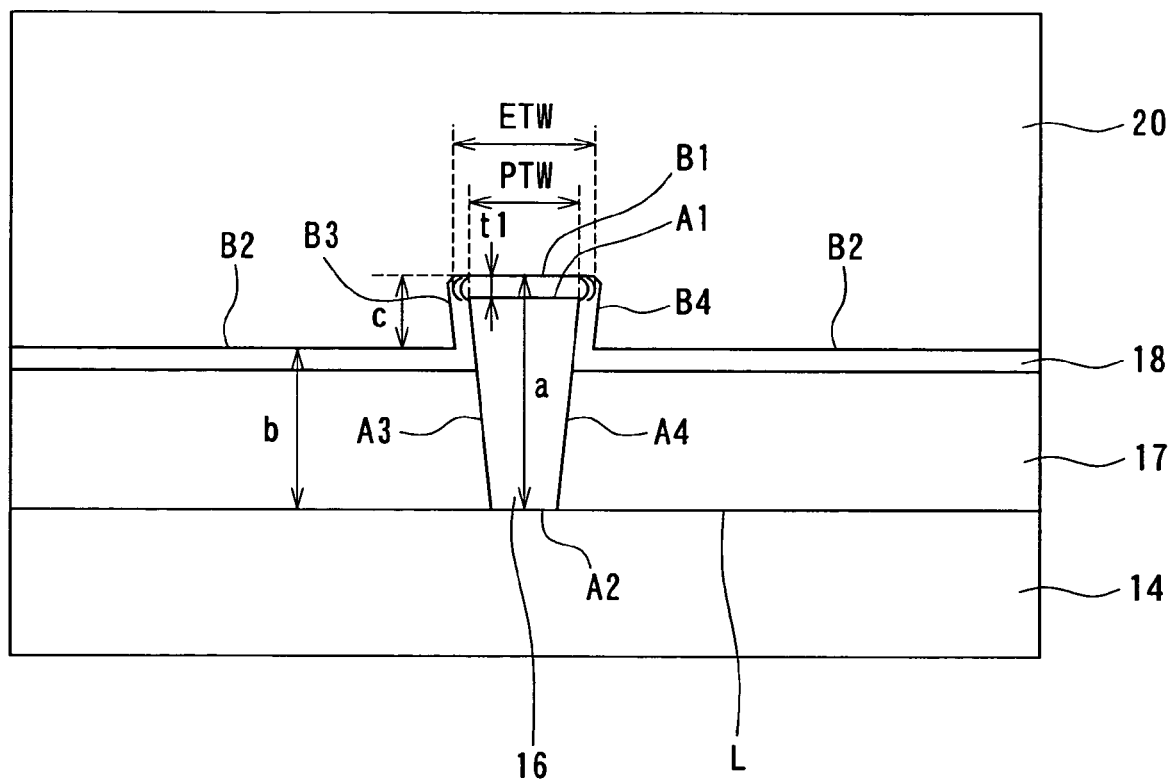
FIG. 15 illustrates a portion of the medium facing surface for describing features of the first embodiment of the invention.

As shown in FIG. 15, the end of the pole layer 16 located in the medium facing surface 30 has: a first side A1 closer to the gap layer 18; a second side A2 opposite to the first side A1; a third side A3 connecting an end of the first side A1 to an end of the second side A2; and a fourth side A4 connecting the other end of the first side A1 to the other end of the second side A2. The end of the shield layer 20 located in the medium facing surface 30 has an edge located on a side of the gap layer 18. This edge includes: a first portion B1 facing toward the first side A1, the gap layer 18 being disposed in between; two second portions B2 disposed on both sides of the first portion B1 opposed to each other in the direction of the track width and disposed such that a difference 'c' in level is created between the first portion B1 and each of the second portions B2; a third portion B3 connecting an end of the first portion B1 to one of the second portions B2; and a fourth portion B4 connecting the other end of the first portion B1 to the other of the second portions B2. Each of the difference 'c' in level and the distance 'b' between the second portions B2 and the straight line L drawn in line with the second side A2 is smaller than the distance 'a' between the straight line L and the first portion B1.

Figure 29:
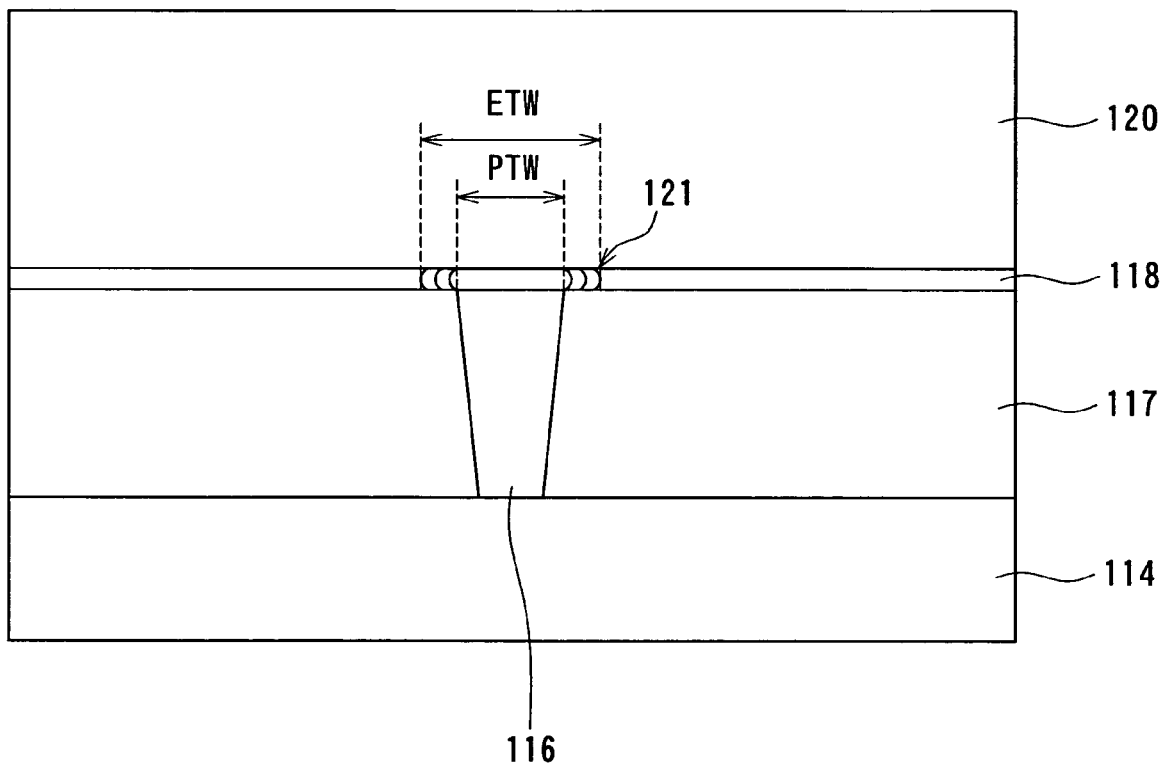
FIG. 29 is a front view of a portion of the medium facing surface of an example of a shield-type head.

The length of the first side A1 is the physical track width PTW. In FIG. 15 'ETW' indicates the effective track width. According to the embodiment, in the neighborhood of the ends of the first side A1, the shield layer 20 exists near the two sides of the pole layer 16. Consequently, the magnetic flux starting from the pole layer 16 over the gap layer 18 and reaching the shield layer 20 is more suppressed from extending in the direction of the track width, compared with the case in which, as shown in FIG. 29, the end of the shield layer 120 located in the medium facing surface has a flat edge on a side of the gap layer 118. As a result, according to the embodiment, it is possible to reduce the difference between the physical track width PTW and the effective track width ETW. For example, if the physical track width PTW is 0.12 μm, the thickness of the pole layer 16 is 0.3 μm and the thickness of the gap layer 18 is 50 nm, it is possible that the difference between the physical track width PTW and the effective track width ETW is 0.01 μm or smaller.

Figure 16:
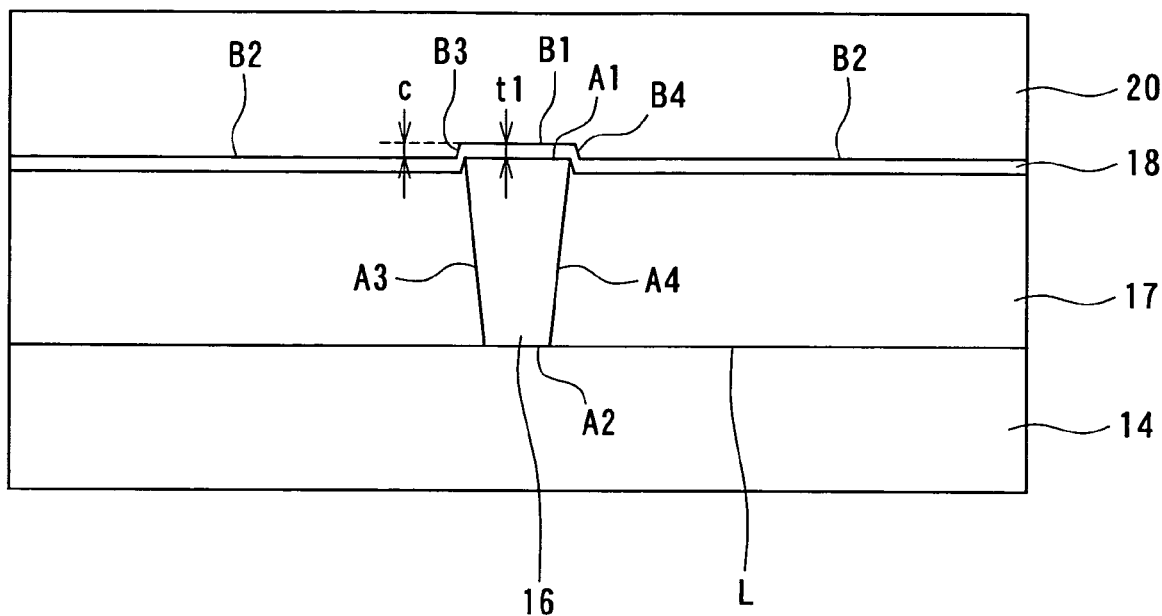
FIG. 16 illustrates a portion of the medium facing surface for describing the features of the first embodiment.

According to the embodiment, the difference 'c' in level is preferably equal to or greater than the thickness t1 of the gap layer between the first side A1 and the first portion B1. FIG. 15 illustrates the case in which the difference 'c' in level is greater than the thickness t1. FIG. 16 illustrates the case in which the difference 'c' in level is equal to the thickness t1. When the difference 'c' in level is equal to or greater than the thickness t1, the shield layer 20 is located closer to the two sides of the pole layer 16 in the neighborhood of the ends of the first side A1, compared with the case in which the difference 'c' in level is smaller than the thickness t1. As a result, the above-mentioned effect of reducing the difference between the physical track width PTW and the effective track width ETW is more noticeable.

Figure 17:
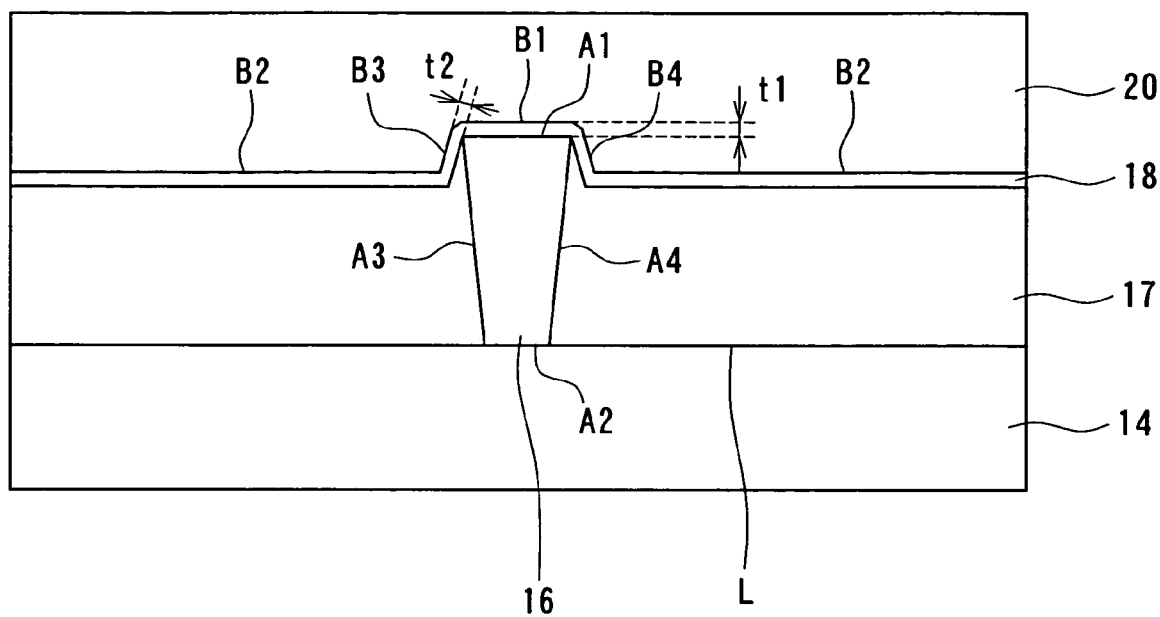
FIG. 17 illustrates a portion of the medium facing surface for describing the features of the first embodiment.

According to the embodiment, as shown in FIG. 17, it is preferred that each of the distance between the third portion B3 and the pole layer 16 and the distance between the fourth portion B4 and the pole layer 16 is smaller than the thickness t1 of the gap layer 18 between the first side A1 and the first portion B1. The reason is that the shield layer 20 is thereby allowed to be closer to the two sides of the pole layer 16 in the neighborhood of the ends of the first side A1, and the effect of reducing the difference between the physical track width PTW and the effective track width ETW is thereby made more noticeable.

According to the embodiment, the distance between the third portion B3 and the pole layer 16 is equal to the thickness of a portion of the gap layer 18 that is in contact with the third portion B3. Similarly, the distance between the fourth portion B4 and the pole layer 16 is equal to the thickness of a portion of the gap layer 18 that is in contact with the fourth portion B4. Here, each of the thickness of the portion of the gap layer 18 that is in contact with the third portion B3 and the thickness of the portion of the gap layer 18 that is in contact with the fourth portion B4 is represented as 't2'. According to the embodiment, the thickness t2 is preferably smaller than the thickness t1. By making the thickness t2 smaller than the thickness t1, the shield layer 20 is located closer to the two sides of the pole layer 16 in the neighborhood of the ends of the first side A1. The above-mentioned effect of reducing the difference between the physical track width PTW and the effective track width ETW is thereby made more noticeable.

According to the embodiment, the gap layer 18 is formed on the surface having a difference in level. In this case, a portion of the gap layer 18 disposed on a sloped surface has a thickness smaller than a portion disposed on a horizontal surface. Therefore, the thickness t2 is smaller than the thickness t1. For example, if the thickness t1 is 40 to 60 nm, the thickness t2 is 30 to 40 nm.

Figure 18:
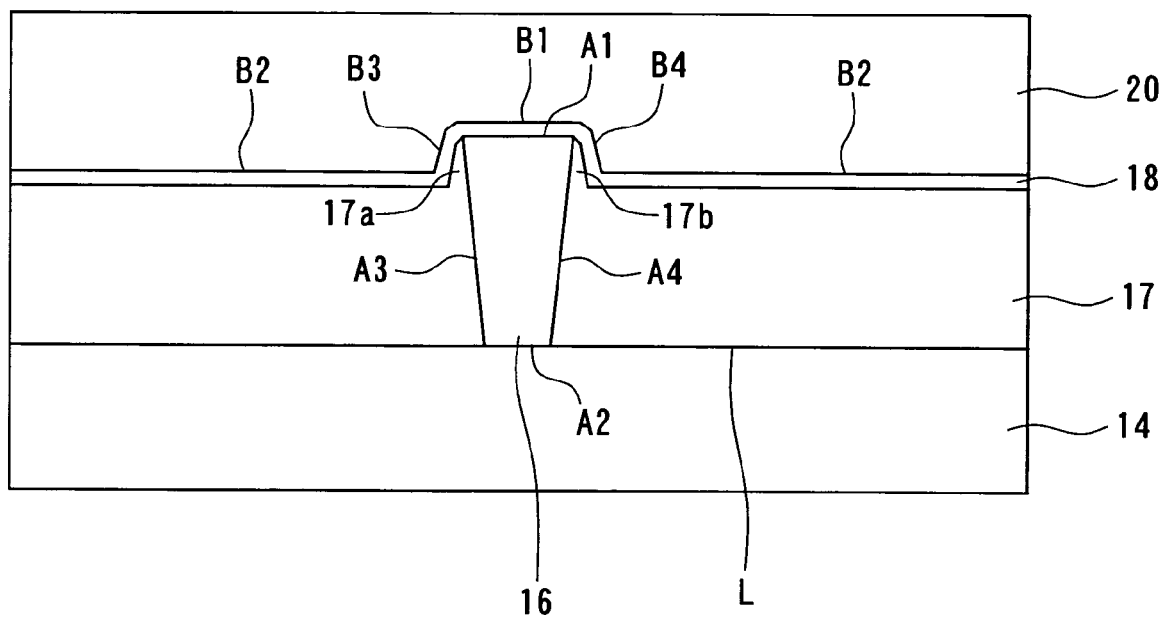
FIG. 18 illustrates a portion of the medium facing surface for describing the features of the first embodiment.

According to the embodiment, as shown in FIG. 18, the nonmagnetic layer 17 may incorporate: a protrusion 17*a* located between the third side A3 and the third portion B3; and a protrusion 17*b* located between the fourth side A4 and the fourth portion B4. In this case, it is preferred that each of the protrusions 17*a* and 17*b* has a width taken along the track width that decreases as the distance from the first side A1 decreases. In this case, it is possible that the distance between the shield layer 20 and the pole layer 16 taken along the track width increases as the distance from the first side A1 increases. As a result, expansion of the magnetic flux is suppressed near the ends of the first side A1, and flux leakage is reduced in a region far below the first side A1. It is thereby possible to reduce the difference between the physical track width PTW and the effective track width ETW and to improve the overwrite property.

To make the nonmagnetic layer 17 have the protrusions 17a and 17b, it is preferred that, in the step of etching the nonmagnetic layer 17 as shown in FIG. 12A and FIG. 12B, reactive ion etching is employed, using an etching gas including a halogen gas and an inert gas such as $O_2$, $CO_2$, $N_2$, $H_2$ or He. The halogen gas may be $BCl_3$ or a gas containing $Cl_2$ and $BCl_3$. The etching is preferably performed at a temperature that falls within a range of 50 to 250° C. inclusive.

According to the embodiment, the flat-whorl-shaped coils 9 and 22 may be replaced with coils wound in a helical manner around the yoke layer 13 and the pole layer 16.

[Second Embodiment]

Figure 19:
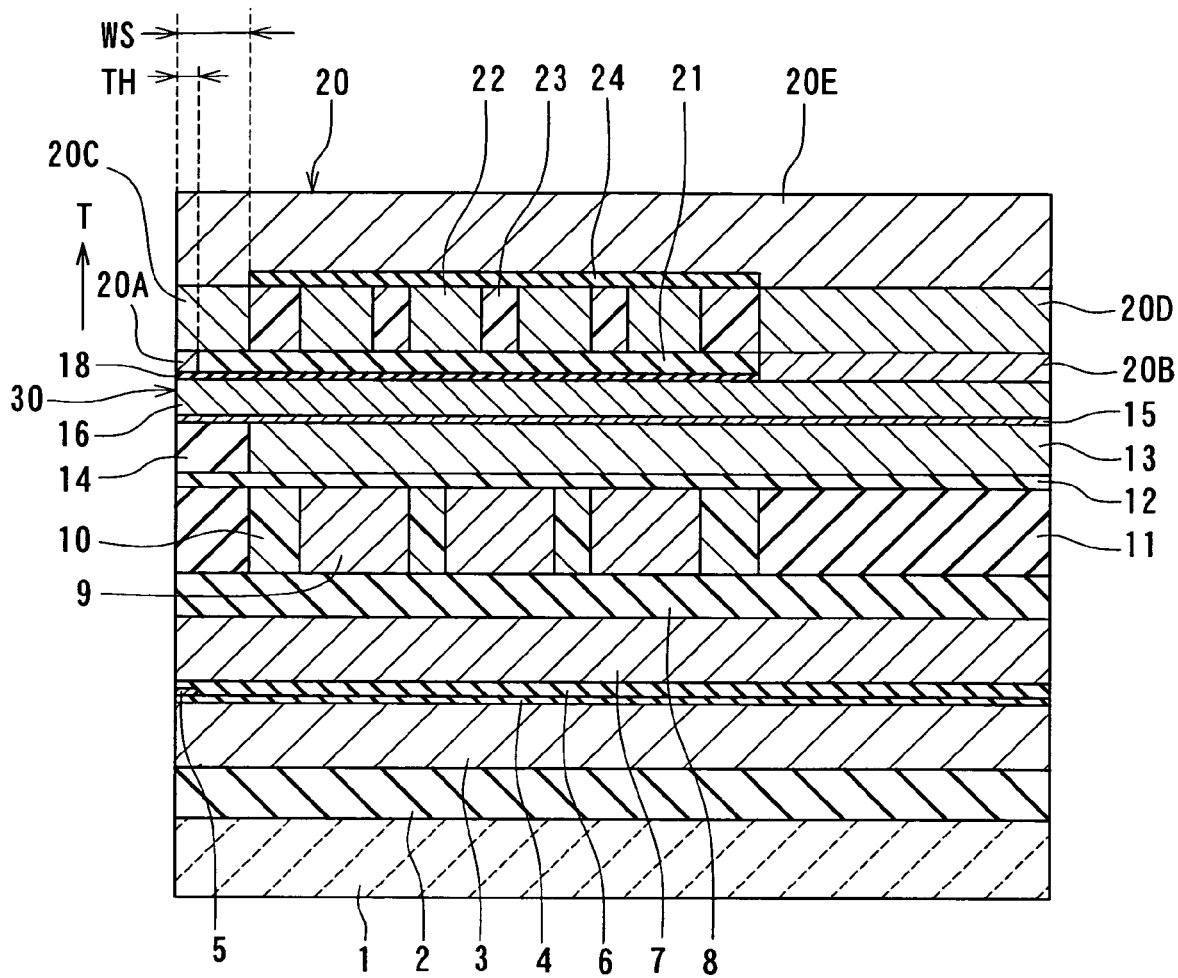
FIG. 19 is a cross-sectional view for illustrating the configuration of a magnetic head of a second embodiment of the invention.
Figure 20:
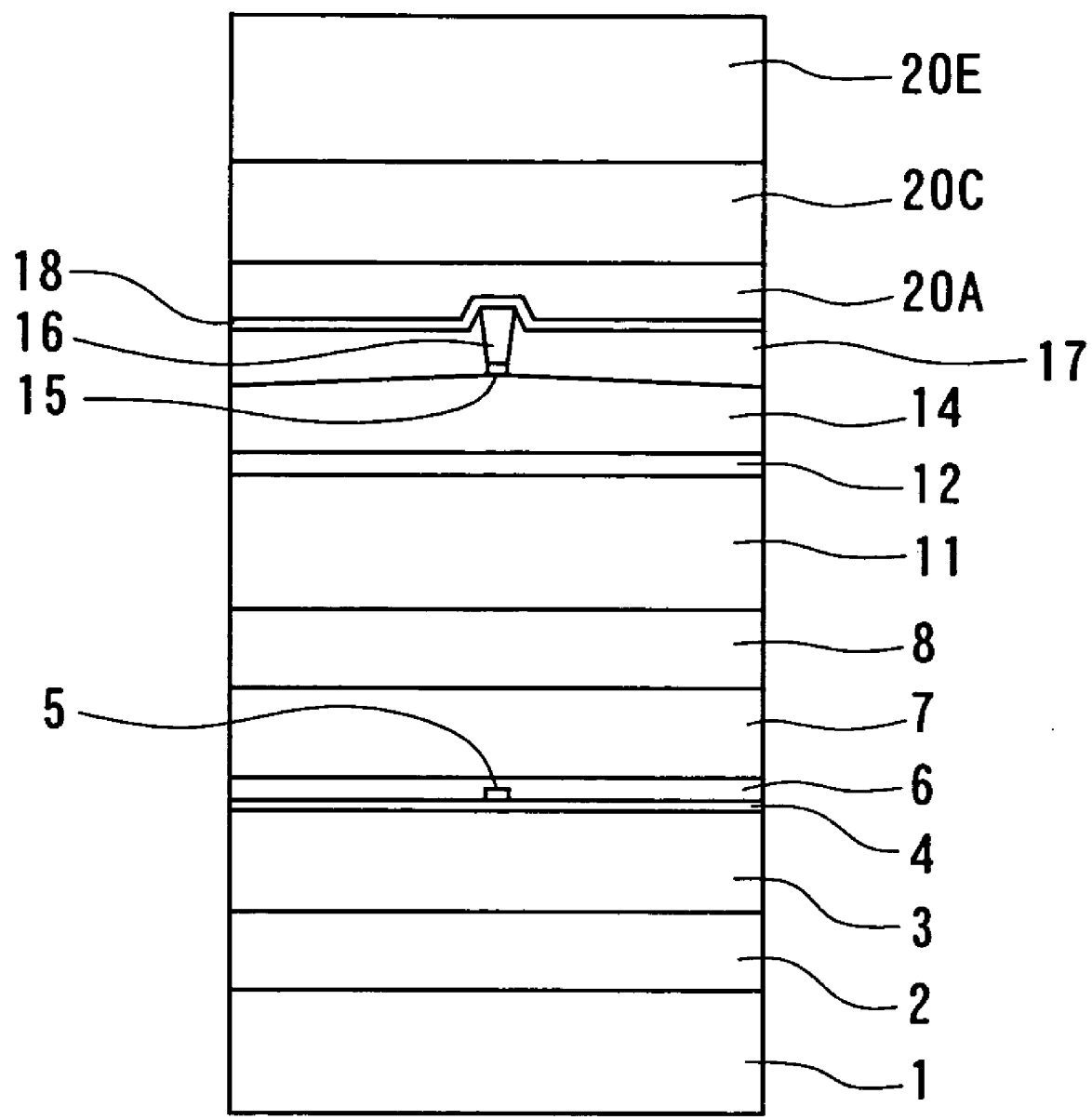
FIG. 20 is a front view of the medium facing surface of the magnetic head of FIG. 19.

A magnetic head and a method of manufacturing the same of a second embodiment of the invention will now be described. Reference is now made to FIG. 19 and FIG. 20 to describe the configuration of the magnetic head of the second embodiment. FIG. 19 is a cross-sectional view for illustrating the configuration of the magnetic head of the embodiment. FIG. 19 illustrates a cross section orthogonal to the medium facing surface and a surface of a substrate. The arrow indicated with T in FIG. 19 shows the direction of travel of a recording medium. FIG. 20 is a front view of the medium facing surface of the magnetic head of the embodiment.

The magnetic head of the second embodiment comprises an electrode film 15 disposed below the pole layer 16, in addition to the components of the magnetic head of the first embodiment. The electrode film 15 is made of a magnetic material. The material of the electrode film 15 may be NiFe, for example. The magnetic head of the second embodiment comprises the second layer 20C, the coupling layer 20D, the coil 22 and the insulating layer 23 each of which has a flattened top surface. The magnetic head of the second embodiment comprises an insulating layer 24 disposed on the coil 22 and the insulating layer 23. The insulating layer 24 may be made of alumina, for example. The third layer 20E of the shield layer 20 is disposed on the insulating layer 24.

Reference is now made to FIG. 21A to FIG. 28A and FIG. 21B to FIG. 28B to describe the method of manufacturing the magnetic head of the second embodiment. FIG. 21A to FIG. 28A are cross sections of layered structures obtained in the course of the manufacturing process orthogonal to the medium facing surface and the substrate. FIG. 21B to FIG. 28B are cross sections of portions of the layered structures near the medium facing surface that are parallel to the medium facing surface. Portions closer to the substrate 1 than the insulating layer 12 are omitted in FIG. 21A to FIG. 28A and FIG. 21B to FIG. 28B.

The method of manufacturing the magnetic head of the second embodiment includes the steps up to the step of flattening the top surfaces of the yoke layer 13 and the insulating layer 14 that are the same as those of the first embodiment.

FIG. 21A and FIG. 21B illustrate the following step. In the step, first, the electrode film 15 having a thickness of 50 nm, for example, is formed by sputtering on the top surfaces of the yoke layer 13 and the insulating layer 14. Next, a photoresist layer having a thickness of 1 μm, for example, is formed on the electrode film 15, and the photoresist layer is patterned to form a frame 31 for making the pole layer 16. As shown in FIG. 21B, the frame 31 has a groove 31a having a shape corresponding to the pole layer 16.

Next, as shown in FIG. 22A and FIG. 22B, the pole layer 16 is formed in the groove 31a of the frame 31, by using frame plating. At this time, the pole layer 16 has a thickness that falls within a range of 0.5 to 0.9 μm, for example.

Next, as shown in FIG. 23A and FIG. 23B, the electrode film 15 except a portion below the pole layer 16 is removed by ion beam etching, for example. Through this etching, a desired value is obtained for each of the thickness of the pole layer 16, the physical track width, and the angle formed between the direction orthogonal to the top surface of the substrate 1 and each of the two sides of the pole layer 16 opposed to each other in the direction of the track width in the neighborhood of the medium facing surface 30. The thickness of the pole layer 16 falls within a range of 0.4 to 0.6 μm, for example. The physical track width is 0.12 μm, for example. The angle formed between the direction orthogonal to the top surface of the substrate 1 and each of the two sides of the pole layer 16 opposed to each other in the direction of the track width falls within a range of 7 to 12 degrees, for example.

FIG. 24A and FIG. 24B illustrate the following step. In the step, first, the nonmagnetic layer 17 having a thickness equal to the total thickness of the electrode film 15 and the pole layer 16 is formed on the entire top surface of the layered structure. Next, although not shown, a stopper film having a thickness of 10 to 20 nm, for example, is formed on the nonmagnetic layer 17 except a region near the pole layer 16. The stopper film may be made of a nonmagnetic refractory metal such as Ta, Ru or W. Next, an insulating film made of alumina, for example, and having a thickness of 0.5 to 0.8 μm, for example, is formed on the entire top surface of the layered structure. The insulating film is then polished by CMP, for example. This polishing is stopped when the stopper film is exposed. Next, the stopper film is removed by reactive ion etching or wet etching, for example. The top surface of the nonmagnetic layer 17 is thereby exposed. Next, the top surface of the nonmagnetic layer 17 is slightly polished by CMP, for example, to expose the top surface of the pole layer 16 and to flatten the top surfaces of the pole layer 16 and the nonmagnetic layer 17. The thickness of the pole layer 16 is thereby controlled to be of a desired value.

Next, as shown in FIG. 25A and FIG. 25B, a portion of the nonmagnetic layer 17 is etched. Through this etching, the top surface of the nonmagnetic layer 17 is made to be located lower than the top surface of the pole layer 16, and a difference in level is created between the top surface of the pole layer 16 and the top surface of the nonmagnetic layer 17. The nonmagnetic layer 17 may be etched by reactive ion etching, for example. In this case, it is preferred to use an etching gas containing a halogen gas and an additive gas such as $O_2$, $CO_2$, $N_2$, $H_2$, He, Ar or $CF_4$. The halogen gas may be $BCl_3$ or a gas containing $Cl_2$ and $BCl_3$. The etching is preferably performed at a temperature that falls within a range of 50 to 250° C. inclusive.

FIG. 26A and FIG. 26B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. The first layer 20A and the coupling layer 20B may be formed by frame plating or by making a magnetic layer through sputtering and then selectively etching the magnetic layer. Next, the nonmagnetic layer 21 is formed on the entire top surface of the layered structure. Next, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened. Through this polishing, the first layer 20A is made to have a thickness of 0.3 to 0.5 µm, for example. Next, the coil 22 is formed by frame plating, for example, such that at least part of the coil 22 is disposed on the nonmagnetic layer 21.

FIG. 27A and FIG. 27B illustrate the following step. In the step, first, the second layer 20C and the coupling layer 20D are formed by frame plating, for example. Next, the insulating layer 23 of photoresist, for example, is selectively formed in the space between adjacent ones of the turns of the coil 22 and around the coil 22. Next, although not shown, an insulating film made of alumina, for example, and having a thickness of 3 to 5 µm, for example, is formed on the entire top surface of the layered structure. Next, the insulating film is polished by CMP, for example, so that the second layer 20C, the coupling layer 20D and the coil 22 are exposed, and the top surfaces of the second layer 20C, the coupling layer 20D, the coil 22 and the insulating layer 23 are thereby flattened. Alternatively, the coil 22 may be formed after the second layer 20C and the coupling layer 20D are formed.

FIG. 28A and FIG. 28B illustrate the following step. In the step, first, the insulating layer 24 is formed on the coil 22 and the insulating layer 23. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The remainder of configuration, function and effects of the second embodiment are similar to those of the first embodiment.

The present invention is not limited to the foregoing embodiments but may be practiced in still other ways. For example, in the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end located in the medium facing surface, allowing a magnetic flux corresponding to the field generated by the coil to pass therethrough, and generating a write magnetic field for writing the data on the recording medium through the use of a perpendicular magnetic recording system;
    a shield layer having an end located in the medium facing surface, a portion of the shield layer located away from the medium facing surface being coupled to the pole layer; and
    a gap layer made of a nonmagnetic material and provided between the pole layer and the shield layer, wherein:
    in the medium facing surface, the end of the shield layer is disposed forward of the end of the pole layer along a direction of travel of the recording medium with a specific space created by a thickness of the gap layer;
    at least part of the coil is disposed between the pole layer and the shield layer and insulated from the pole layer and the shield layer;
    the end of the pole layer located in the medium facing surface incorporates: a first side closer to the gap layer; a second side opposite to the first side; a third side connecting an end of the first side to an end of the second side; and a fourth side connecting the other end of the first side to the other end of the second side;
    the end of the shield layer located in the medium facing surface has an edge on a side of the gap layer, the edge including: a first portion facing toward the first side, the gap layer being disposed in between; two second portions that are disposed on both sides of the first portion opposed to each other in the direction of the track width and that are disposed such that a difference in level is created between the first portion and each of the second portions; a third portion connecting an end of the first portion to one of the second portions; and a fourth portion connecting the other end of the first portion to the other one of the second portions; and
    each of the difference in level and a distance between a straight line drawn in line with the second side and the second portions is smaller than a distance between the straight line and the first portion.

2. The magnetic head according to claim 1, wherein the difference in level is equal to or greater than a thickness of the gap layer between the first side and the first portion.

3. The magnetic head according to claim 1, wherein each of a distance between the third portion and the pole layer and a distance between the fourth portion and the pole layer is smaller than a thickness of the gap layer between the first side and the first portion.

4. The magnetic head according to claim 1, wherein: the gap layer includes a portion disposed between the first side and the first portion, a portion touching the third portion, and a portion touching the fourth portion; and each of the portion touching the third portion and the portion touching the fourth portion has a thickness smaller than that of the portion disposed between the first side and the first portion.

5. The magnetic head according to claim 1, further comprising a nonmagnetic layer that is made of a nonmagnetic material and touches the third side and the fourth side.

6. The magnetic head according to claim 5, wherein:
    the nonmagnetic layer has two protrusions disposed between the third side and the third portion and between the fourth side and the fourth portion, respectively; and
    each of the protrusions has a width that is taken along the track width and that decreases as a distance from the first side decreases.

7. The magnetic head according to claim 1, wherein the end of the pole layer located in the medium facing surface has a shape of trapezoid in which the first side is longer than the second side.

8. A method of manufacturing a magnetic head for perpendicular magnetic recording comprising:

a medium facing surface that faces toward a recording medium;

a coil for generating a magnetic field corresponding to data to be written on the recording medium;

a pole layer having an end located in the medium facing surface, allowing a magnetic flux corresponding to the field generated by the coil to pass therethrough, and generating a write magnetic field for writing the data on the recording medium through the use of a perpendicular magnetic recording system;

a shield layer having an end located in the medium facing surface, a portion of the shield layer located away from the medium facing surface being coupled to the pole layer; and a gap layer made of a nonmagnetic material and provided between the pole layer and the shield layer, wherein:

in the medium facing surface, the end of the shield layer is disposed forward of the end of the pole layer along a direction of travel of the recording medium with a specific space created by a thickness of the gap layer; and at least part of the coil is disposed between the pole layer and the shield layer and insulated from the pole layer and the shield layer, the method comprising the steps of:

forming the pole layer;

forming the gap layer on the pole layer;

forming the shield layer on the gap layer; and forming the coil, wherein:

the end of the pole layer located in the medium facing surface is made to incorporate: a first side closer to the gap layer; a second side opposite to the first side; a third side connecting an end of the first side to an end of the second side; and a fourth side connecting the other end of the first side to the other end of the second side;

in the step of forming the shield layer, the end of the shield layer located in the medium facing surface is made to have an edge on a side of the gap layer, the edge including: a first portion facing toward the first side, the gap layer being disposed in between; two second portions that are disposed on both sides of the first portion opposed to each other in the direction of the track width and that are disposed such that a difference in level is created between the first portion and each of the second portions; a third portion connecting an end of the first portion to one of the second portions; and a fourth portion connecting the other end of the first portion to the other one of the second portions; and each of the difference in level and a distance between a straight line drawn in line with the second side and the second portions is smaller than a distance between the straight line and the first portion.

9. The method according to claim 8, wherein the difference in level is equal to or greater than a thickness of the gap layer between the first side and the first portion.

10. The method according to claim 8, wherein each of a distance between the third portion and the pole layer and a distance between the fourth portion and the pole layer is smaller than a thickness of the gap layer between the first side and the first portion.

11. The method according to claim 8, wherein: the gap layer is made to include a portion disposed between the first side and the first portion, a portion touching the third portion, and a portion touching the fourth portion; and each of the portion touching the third portion and the portion touching the fourth portion has a thickness smaller than that of the portion disposed between the first side and the first portion.

12. The method according to claim 8, further comprising the step of forming a nonmagnetic layer that is made of a nonmagnetic material and touches the third side and the fourth side, the step being provided between the step of forming the pole layer and the step of forming the gap layer.

13. The method according to claim 12, wherein:

the nonmagnetic layer is made to have two protrusions disposed between the third side and the third portion and between the fourth side and the fourth portion, respectively; and each of the protrusions has a width that is taken along the track width and that decreases as a distance from the first side decreases.

14. The method according to claim 8, wherein the end of the pole layer located in the medium facing surface is made to have a shape of trapezoid in which the first side is longer than the second side.

* * * * *